US012768303B2

(12) United States Patent
Versaevel et al.

(10) Patent No.: US 12,768,303 B2
(45) Date of Patent: Oct. 20, 2026

(54) ACOUSTIC PANEL HAVING OBLIQUE CAVITIES

(71) Applicant: SAFRAN NACELLES, Gonfreville-l'Orcher (FR)

(72) Inventors: Marc Versaevel, Moissy Cramayel (FR); Bertrand Léon Marie Desjoyeaux, Moissy Cramayel (FR); Pierre-Yves Gini, Moissy Cramayel (FR); Sébastien Laurent Marie Pascal, Moissy Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 29 days.

(21) Appl. No.: 18/687,369

(22) PCT Filed: Aug. 24, 2022

(86) PCT No.: PCT/FR2022/051605
§ 371 (c)(1),
(2) Date: Feb. 28, 2024

(87) PCT Pub. No.: WO2023/031540
PCT Pub. Date: Mar. 9, 2023

(65) Prior Publication Data

US 2025/0122840 A1 Apr. 17, 2025

(30) Foreign Application Priority Data

Aug. 30, 2021 (FR) ...................................... 2109018

(51) Int. Cl.
*B32B 3/12* (2006.01)
*B32B 15/092* (2006.01)
(Continued)

(52) U.S. Cl.
CPC .............. *F02C 7/24* (2013.01); *B32B 15/092* (2013.01); *B32B 15/20* (2013.01); *F02C 7/045* (2013.01); *F02K 1/827* (2013.01); *B32B 2250/03* (2013.01); *B32B 2250/40* (2013.01); *B32B 2260/021* (2013.01); *B32B 2260/046* (2013.01);
(Continued)

(58) Field of Classification Search
None
See application file for complete search history.

(56) References Cited

U.S. PATENT DOCUMENTS 3,821,999 A 7/1974 Guess et al.
4,826,106 A * 5/1989 Anderson ................ F02K 1/82 428/116

(Continued)

FOREIGN PATENT DOCUMENTS

FR 2954281 A1 6/2011
WO 9212854 A1 8/1992

OTHER PUBLICATIONS

International Search Report for PCT/FR2022/051605 dated Oct. 11, 2022.

(Continued)

*Primary Examiner* — Mary I Omori
(74) *Attorney, Agent, or Firm* — McDonald Hopkins LLC

(57) ABSTRACT

An acoustic panel comprising a first group of cavities oriented towards a front end of the panel and a second group of cavities oriented towards a rear end of the panel.

9 Claims, 3 Drawing Sheets

(51) Int. Cl.

| | |
|---|---|
| ***B32B 15/20*** | (2006.01) |
| ***F02C 7/045*** | (2006.01) |
| ***F02C 7/24*** | (2006.01) |
| ***F02K 1/82*** | (2006.01) |

(52) U.S. Cl.

CPC ..... *B32B 2262/106* (2013.01); *B32B 2305/02* (2013.01); *B32B 2307/102* (2013.01); *B32B 2363/00* (2013.01); *B32B 2605/18* (2013.01); *F05D 2220/323* (2013.01); *F05D 2300/603* (2013.01)

(56) References Cited

U.S. PATENT DOCUMENTS

| | | | | |
|---|---|---|---|---|
| 2012/0318924 | A1* | 12/2012 | Porte | B64D 33/02 244/134 D |
| 2015/0110603 | A1* | 4/2015 | Biset | F02C 7/045 415/119 |
| 2018/0148187 | A1* | 5/2018 | Valleroy | G10K 11/168 |
| 2019/0039745 | A1 | 2/2019 | Haile et al. | |
| 2019/0161200 | A1* | 5/2019 | Versaevel | B64D 33/06 |
| 2020/0298987 | A1* | 9/2020 | Evans | B64D 33/02 |
| 2024/0217667 | A1* | 7/2024 | Gonidec | G10K 11/172 |

OTHER PUBLICATIONS

Written Opinion of the International Searching Authority for PCT Application No. PCT/FR2022/051605 dated Oct. 11, 2022.

* cited by examiner

ACOUSTIC PANEL HAVING OBLIQUE CAVITIES

CROSS-REFERENCE TO RELATED APPLICATIONS

This is a National Stage application of PCT international application PCT/FR2022/051605, filed on Aug. 24, 2022, which claims the priority of French Patent Application No. FR 2109018, filed Aug. 30, 2021, both of which are incorporated herein by reference in their entirety.

TECHNICAL FIELD

The invention relates to the field of acoustic panels intended for the aeronautical sector.

PRIOR ART

A conventional aircraft propulsion assembly comprises acoustic panels, commonly called "sandwich panels", comprising two skins and a cellular structure sandwiched therebetween. The cellular structure is generally a honeycomb structure forming acoustic absorption cavities, or Helmholtz cavities, allowing to attenuate the noise generated by the propulsion assembly. For this purpose, the skin intended to be oriented towards the source of the noise is made permeable to air, typically using orifices passing through this skin to be able to guide the air within the cavities and thus absorb the acoustic energy.

Generally speaking, the thickness of the panel determines the length of the cavities and therefore their attenuation capacity. In particular, a longer cavity allows to attenuate waves of greater length and therefore lower frequencies.

To reduce the footprint of the panel while attenuating low frequencies generated by the propulsion assembly, it is known to incline the cavities in the manner described in documents U.S. Pat. No. 3,821,999 and WO92/12854.

The solutions proposed in these documents pose difficulties for the manufacture of contemporary thermosetting composite panels, which generally comprise bevelled edges, also called chamfers. Such chamfers allow to join the two skins of the panel so as to form monolithic returns for closing the panel.

FIG. 1 shows a panel A1 comprising a perforated skin A2, a solid skin A3 and a cellular structure A4 forming inclined cavities A5. The panel A1 comprises a front edge A6 and a bevelled rear edge A7. In this example, the cavities A5 are oriented towards the front edge A6 of the panel A1 so that their axis A8 forms a relatively large angle A9 with the front edge A6 and a relatively small angle A10 with the rear edge A7.

Given such an angle A10, there is a risk of the panel A1 collapsing at the rear edge A7 under the action of the pressure applied during its curing.

DESCRIPTION OF THE INVENTION

The invention aims at providing an acoustic panel capable of attenuating low frequencies while having a reduced footprint.

The invention also has the purpose of overcoming the aforementioned manufacturing difficulties.

Another purpose of the invention is to provide a panel of reduced mass.

Yet another purpose of the invention is to reduce the cost of manufacturing such a panel.

To this end, the invention relates to an acoustic panel for an aircraft propulsion assembly, comprising a first skin, a second skin and a cellular structure forming acoustic absorption cavities which each extend along an oblique axis relative to the first skin. According to the invention, the cavities are distributed into several groups including a first group wherein the cavities are oriented towards a front end of the panel and a second group wherein the cavities are oriented towards a rear end of the panel.

On the one hand, the inclination of the cavities allows them to have an acoustic length greater than the distance between the first and the second skin. The invention thus allows to reduce the size of the panel while maintaining good acoustic performance and, in particular, to attenuate lower frequencies for a given footprint compared to a conventional panel.

On the other hand, the distribution of the cavities into two groups of different orientation allows to reduce the risk of collapse during manufacturing while producing a panel with bevelled edges. The panel therefore does not require installing means for supporting or joining the skins at the front and rear ends of the panel, or else stabilisation means, which allows to reduce the mass and cost of the panel.

The invention thus allows to provide an acoustic panel compatible both with a bevelled panel edge geometry and with new generation propulsion assemblies, which can in particular be distinguished from a conventional propulsion assembly by a larger overall diameter, a lower fan rotation speed and therefore lower frequencies to be attenuated.

In one embodiment, the cellular structure comprises a front block forming the cavities of the first group and a rear block forming the cavities of the second group.

Producing the cellular structure in two blocks makes it easier to manufacture and assemble the panel.

Of course, the cellular structure can comprise more than two blocks. For example, the cellular structure may comprise the aforementioned front and rear blocks as well as one or more intermediate blocks extending between the front and rear blocks. For another example, the cellular structure may comprise the aforementioned front and rear blocks forming a first layer or stage of the cellular structure as well as one or more other blocks forming a second layer or stage of the cellular structure.

In one embodiment, the cellular structure comprises a front edge and a rear edge which are each bevelled.

Preferably, the front edge is formed by the front block and the rear edge is formed by the rear block.

In one embodiment, several of said cavities of the first group open onto the front edge of the cellular structure and several of said cavities of the second group open onto the rear edge of the cellular structure.

The second skin preferably comprises a front part covering the front edge of the cellular structure.

Preferably, the second skin comprises a rear part covering the rear edge of the cellular structure.

The second skin also preferably comprises a middle part connecting the front part and the rear part of the second skin to each other and covering a surface of the cellular structure.

In one embodiment, the front part and the rear part of the second skin each extend obliquely relative to the middle part of the second skin so as to join the first skin.

It is preferred that the front edge and the rear edge of the cellular structure each form with the first skin an angle comprised between 30 degrees and 60 degrees, more preferably between 40 degrees and 50 degrees, for example equal to, or close to, 45 degrees.

Of course, in the case where the first skin is not flat, this angle can be formed with a fictitious plane tangent to the first skin.

Moreover, the front edge and/or the rear edge may be curved. In this case, the aforementioned angle can be formed by a fictitious plane tangent to the front edge and/or the corresponding rear edge.

In one embodiment, the axis of each of the cavities forms an angle of inclination relative to the first skin comprised between 30 degrees and 50 degrees, more preferably between 35 degrees and 45 degrees, for example equal to, or close to, 45 degrees.

Of course, in the case where the first skin is not flat, this axis can be oblique relative to a fictitious plane tangent to the first skin.

In one embodiment, the first skin and/or the second skin comprise an organic matrix composite material.

More preferably, the aforementioned material is a thermosetting composite material, that is to say whose matrix comprises a thermosetting polymer.

In one embodiment, the cellular structure comprises a metal material.

In one embodiment, the panel forms a cylindrical structure or a sector of cylindrical structure.

In one embodiment, the panel forms at least one flat surface.

In one embodiment, the cellular structure comprises several stages.

Preferably, each of the stages of the cellular structure may comprise cavities of the first group and cavities of the second group.

The invention also relates to a propulsion assembly for an aircraft, comprising at least one panel as defined above.

In one embodiment, the panel forms a casing of a turbomachine of the propulsion assembly, or is fixed on such a casing.

The aforementioned casing may be a fan casing.

In one embodiment, the panel forms part of a nacelle of the propulsion assembly.

According to another aspect, the invention also relates to a method for manufacturing a panel as defined above.

In one embodiment, the method comprises a step of assembling the panel followed by a step of curing the panel.

In one embodiment, the assembly step comprises a step of disposing the cellular structure on the first skin and a step of disposing the second skin on the cellular structure.

In one embodiment, the step of disposing the cellular structure on the first skin comprises disposing said front block of the cellular structure on a front part of the first skin and disposing said rear block of the cellular structure on a rear part of the first skin, so that the front block and the rear block of the cellular structure are adjacent to each other.

Other advantages and features of the invention will appear upon reading the detailed, non-limiting description which follows.

BRIEF DESCRIPTION OF THE DRAWINGS

The detailed description which follows refers to the appended drawings wherein.

DETAILED DESCRIPTION OF EMBODIMENTS

Figure 1:
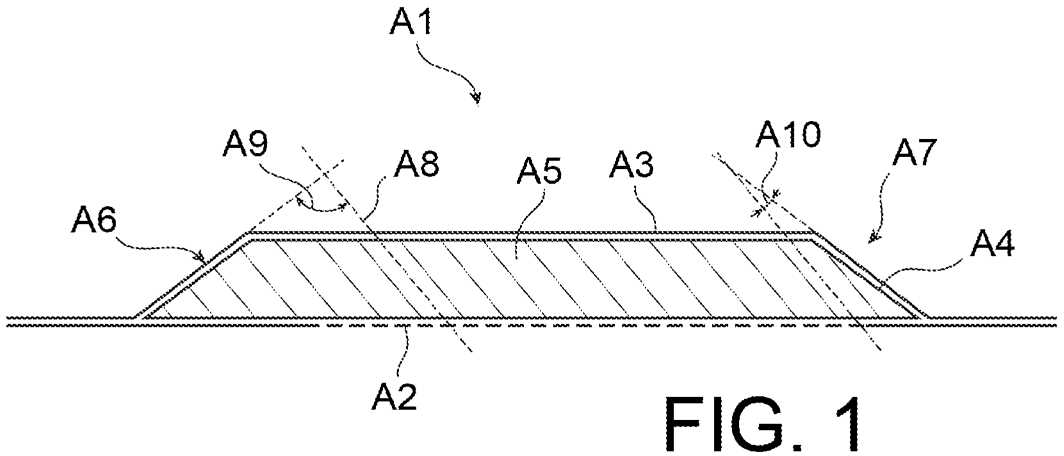
FIG. 1, already described, is a schematic cross-sectional view of a panel comprising bevelled front and rear edges and oblique Helmholtz cavities.
Figure 2:
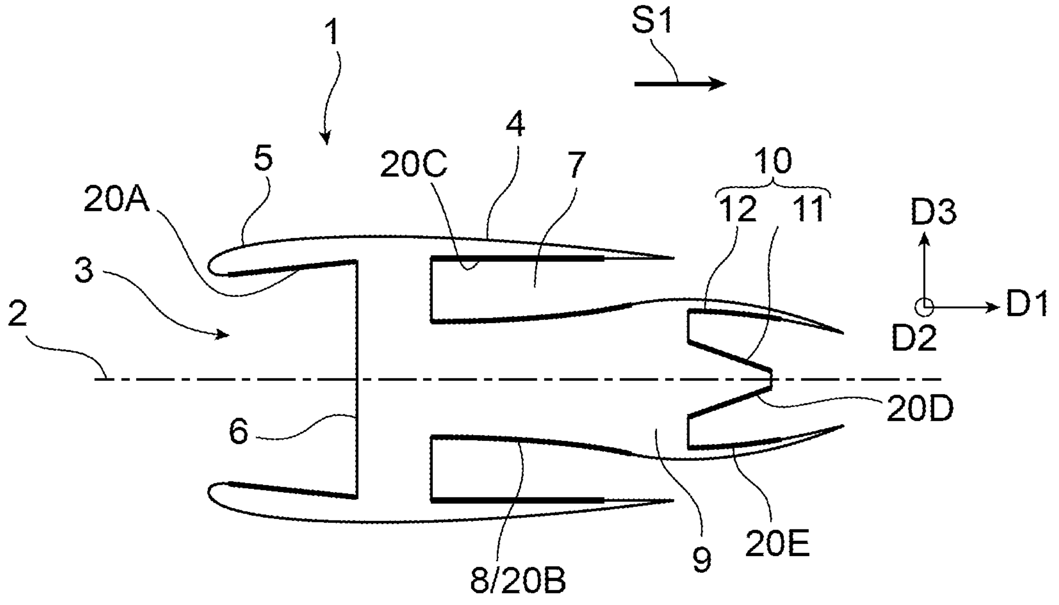
FIG. 2 is a schematic view in longitudinal section of an aircraft propulsion assembly equipped with acoustic panels.

FIG. 2 and following comprise a reference frame D1, D2 and D3 respectively defining a longitudinal/axial direction, a circumferential/tangential direction and a radial direction orthogonal to each other.

A propulsion assembly 1 for an aircraft comprising a turbomachine 3 and a nacelle 4 extending around a central longitudinal axis 2 is shown in a simplified manner in FIG. 2. In this example, the turbomachine 3 is a turbofan engine.

Subsequently, the terms "front" and "rear" are considered in a main direction S1 of gas flow in the propulsion assembly 1 along the axis 2 which is parallel to the direction D1.

In a manner known per se, the propulsion assembly 1 comprises, from front to rear, an air inlet 5, a fan 6, a secondary flow path 7 delimited radially inwards by an internal fairing 8 enveloping a gas generator 9 formed by the turbojet 3 and radially outwards by elements of the nacelle 4, and a duct 10 for ejecting a primary flow leaving the gas generator 9. The duct 10 comprises an ejection cone 11 and an ejection nozzle 12.

The invention relates more specifically to acoustic panels 20 intended to equip such a propulsion assembly 1.

In this non-limiting example, the propulsion assembly 1 comprises several acoustic panels 20 as described below, shown in strong lines in FIG. 2. These panels 20 include panels 20A forming an internal wall of the air inlet 5, panels 20B forming part of the internal fairing 8 and panels 20C delimiting the secondary flow path 7, panels 20D forming an external wall of the ejection cone 11 and panels 20E forming an internal wall of the ejection nozzle 12.

In this example, each of the panels 20A to 20E extends circumferentially around the axis 2 forming a ring sector. Thus, in particular, each of the panels 20A extends over a respective circumferential sector so as to together form a cylindrical structure with axis 2. What has just been described concerning the panels 20A applies by analogy to the panels 20B to 20E.

Figure 3:
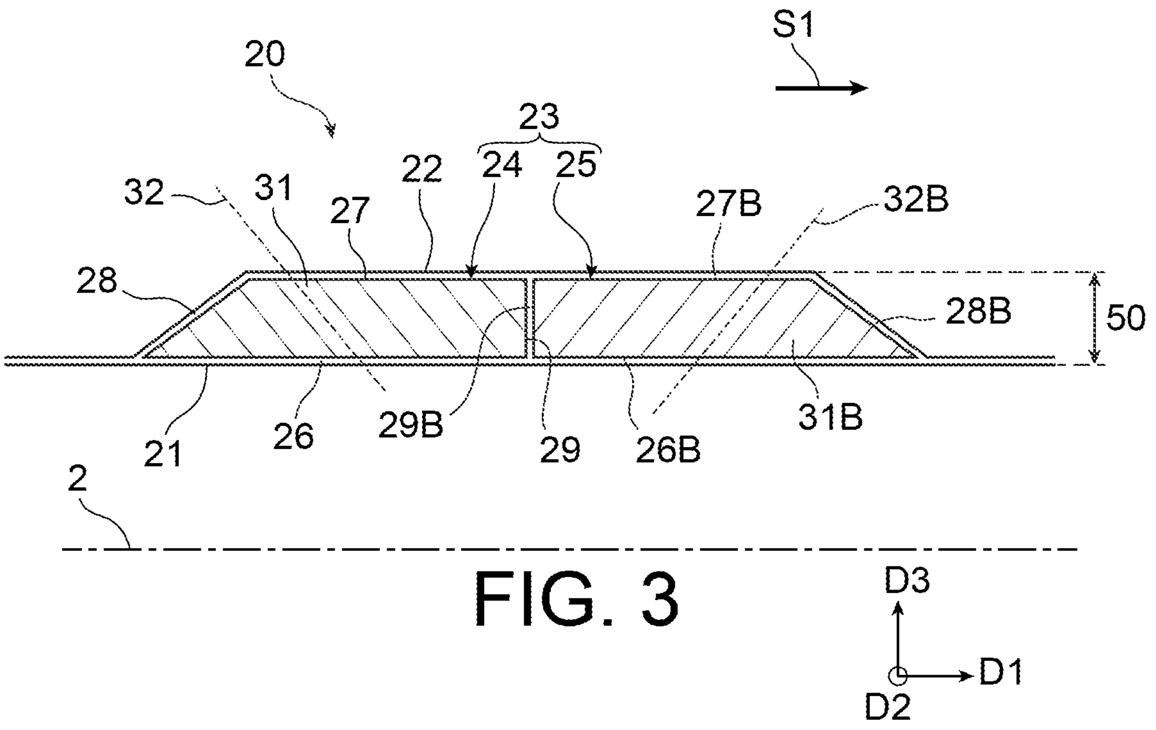
FIG. 3 is a schematic cross-sectional view of a panel according to a first embodiment of the invention, comprising a cellular structure in two blocks sandwiched between two skins, each of the blocks comprising acoustic absorption cavities oriented in one respective direction.

A panel 20 in accordance with a first embodiment of the invention is shown in section in FIG. 3, along a section plane parallel to directions D1 and D3.

The panel 20 comprises a first skin 21, a second skin 22 and a cellular structure 23 comprising in this example a front block 24 and a rear block 25.

Figure 4:
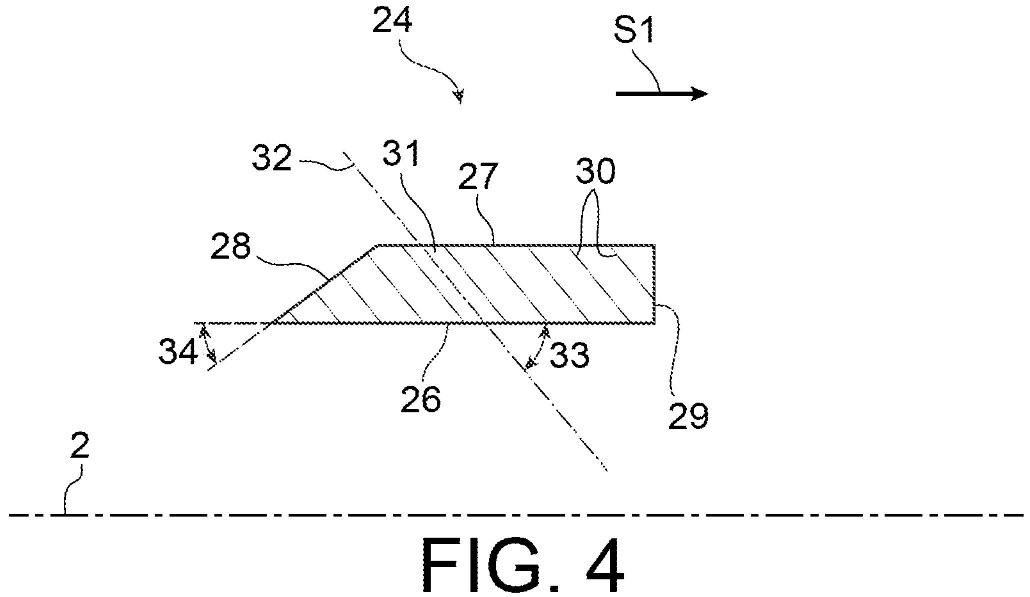
FIG. 4 is a schematic cross-sectional view of one of the blocks of the panel of FIG. 3.

With reference to FIG. 4, the front block 24 has an internal surface 26, an external surface 27, a front surface 28 forming a front edge of the cellular structure 23 and a rear surface 29, giving the front block 24 a quadrilateral shaped section.

In this example, the surfaces 26 to 29 of the front block 24 are, in the section of FIG. 4, shown flat. In particular, in this section, the surfaces 26 and 27 are shown parallel to the axial direction D1 and the rear surface 29 is shown parallel to the radial direction D3. Of course, one or more of these surfaces 26 to 29 may have a curved geometry, both in the section of FIG. 4 and/or in other sections.

In this example, the front block 24 extends in the circumferential direction D2 so as to form a sector of cylindrical structure.

The front block 24 comprises partitions 30 delimiting cavities 31 which extend both radially and axially.

In this example, some of these cavities 31 open on the one hand on the internal surface 26 and on the other hand on the front surface 28, others among these cavities 31 open on the one hand on the internal surface 26 and on the other hand on the external surface 27, and still others among these cavities 31 open on the one hand on the rear surface 29 and on the other hand on the external surface 27.

Each of the cavities 31 extends along an oblique axis 32 relative to the internal 26 and external 27 surfaces.

In this example, the axis 32 of each of the cavities 31 forms with the surfaces 26 and 27 an angle 33 of approximately 45 degrees.

The front surface 28, in turn, forms an angle 34 of approximately 45 degrees relative to the internal surface 26 of the front block 24, so that the front edge of the cellular structure 23 is bevelled.

The result is that, in this particular example, the axis 32 of the cavities 31 opening onto the front surface 28 of the front block 24 forms an angle of approximately 90 degrees with this front surface 28, which allows to reduce the risk of collapse of the panel 20 at this front edge during curing.

Concerning the geometry of the cavities 31, the partitions 30 are in this example configured so that each of the cavities 31 has a hexagonal shaped section, in a plane normal to the axis 32. Alternatively, one or more of the cavities 31 may comprise a triangular, square shaped section or the like. The cavities 31 can have any other shape allowing in particular to avoid telegraphing.

In a manner known per se, the partitions 30 comprise drainage notches (not shown) at the external surface 27. In this example, such notches are also formed at the front surface 28 of the block 24, in order to maximise the acoustic surface.

With reference to FIG. 3, the rear block 25 is in this example symmetrical to the front block 24, with respect to a transverse plane parallel to the directions D2 and D3.

The rear block 25 thus has an internal surface 26B, an external surface 27B, a rear surface 28B forming a bevelled rear edge of the cellular structure 23, a front surface 29B and cavities 31B which also extend radially and axially but in an opposite direction with respect to the cavities 31 of the front block 24.

In other words, the cavities 31B of the rear block 25 each extend along an oblique axis 32B relative to the axis 32 of the cavities 31 of the front block 24.

The preceding description relating to the front block 24 applies by analogy to the rear block 25.

In this example, the blocks 24 and 25 are disposed axially adjacent, so that the rear surface 29 of the front block 24 faces the front surface 29B of the rear block 25.

The first skin 21, also called internal skin, is disposed radially on one side of the cellular structure 23 so as to cover the internal surface 26 of the front block 24 and the internal surface 26B of the rear block 25.

The internal skin 21 matching the internal surfaces 26 and 26B of the cellular structure 23, the aforementioned angles 33 and 34 are also formed respectively between the axis 32 of the cavities 31 and the internal skin 21, and between the front edge 28 of the cellular structure 23. The same applies to the corresponding angles relating to the rear block 25 of the cellular structure 23.

Still with reference to FIG. 3, the second skin 22, also called external skin, is disposed radially on the other side of the cellular structure 23 so as to cover, respectively from front to rear, a front portion of the internal skin 21, the front edge 28 of the cellular structure 23, the external surface 27 of the front block 24, the external surface 27B of the rear block 25, the rear edge 28B of the cellular structure 23 and a rear portion of the internal skin 21.

The panel 20 thus has a bevelled front edge, defined by the front surface 28 of the front block 24 of the cellular structure 23, as well as a bevelled rear edge, defined by the rear surface 28B of the rear block 25 of the cellular structure 23.

In this example, the external skin 22 is solid while the internal skin 21 comprises, on at least part of its surface, openings (not shown) intended to guide air into the cavities 31 and 31B in order to absorb acoustic energy.

The cavities 31 formed by the front block 24 of the cellular structure 23 are thus oriented towards a front end of the panel 20, while the cavities 31B formed by the rear block 25 of the cellular structure 23 are oriented towards a rear end of the panel 20.

In the example of FIG. 3, the panel 20 has a thickness 50, or radial dimension, comprised between 20 mm and 40 mm and the skins 21 and 22 each have a thickness comprised between 0.2 mm and 2 mm, for example 1 mm.

In this example, the skins 21 and 22 are made of composite material with a thermosetting matrix, for example carbon fibre with epoxy resin, and the cellular structure 23 is formed of aluminium foil. In an alternative embodiment, the cellular structure 23 is made from an organic material such as the material known under the name "Nomex®". In another alternative embodiment, the cellular structure 23 is made of an organic matrix composite.

Figure 5:
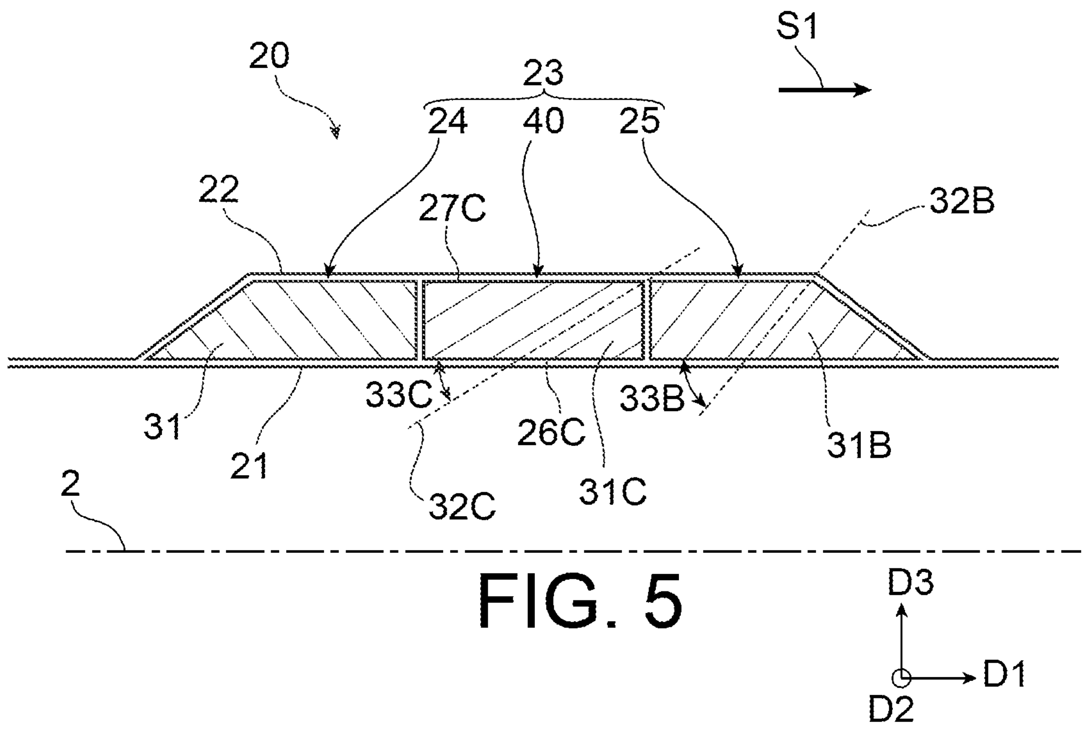
FIG. 5 is a schematic cross-sectional view of a panel according to a second embodiment of the invention, comprising a cellular structure in three blocks sandwiched between two skins.

FIG. 5 shows a panel 20 according to a second embodiment of the invention, which differs from that of FIG. 3 in that the cellular structure 23 comprises a third block 40, also called intermediate block. The panel 20 of FIG. 5 is described only according to its differences compared to that of FIG. 3, the description above relating to the first embodiment applying by analogy to this second embodiment.

With reference to FIG. 5, the intermediate block 40 extends axially between the front block 24 and the rear block 25.

The intermediate block 40 also comprises cavities 31C which each extend along an axis 32C oblique to the internal 26C and external 27C surfaces of the block 40.

In this example, the cavities 31C of the intermediate block 40 are oriented in the same axial direction as the cavities 31B of the rear block 25, that is to say towards the rear of the panel 20, but at an angle 33C different from the corresponding angle 33B formed by the cavities 31B of the rear block 25.

In an alternative embodiment not shown, the cavities 31C of the intermediate block 40 are oriented in the same axial direction as the cavities 31 of the front block 24.

The panel 20 can of course comprise several intermediate blocks similar to the block 40 of FIG. 5.

A cellular structure 23 comprising one or more intermediate blocks 40 allows in particular to increase the axial dimension of the panel 20.

Figure 6:
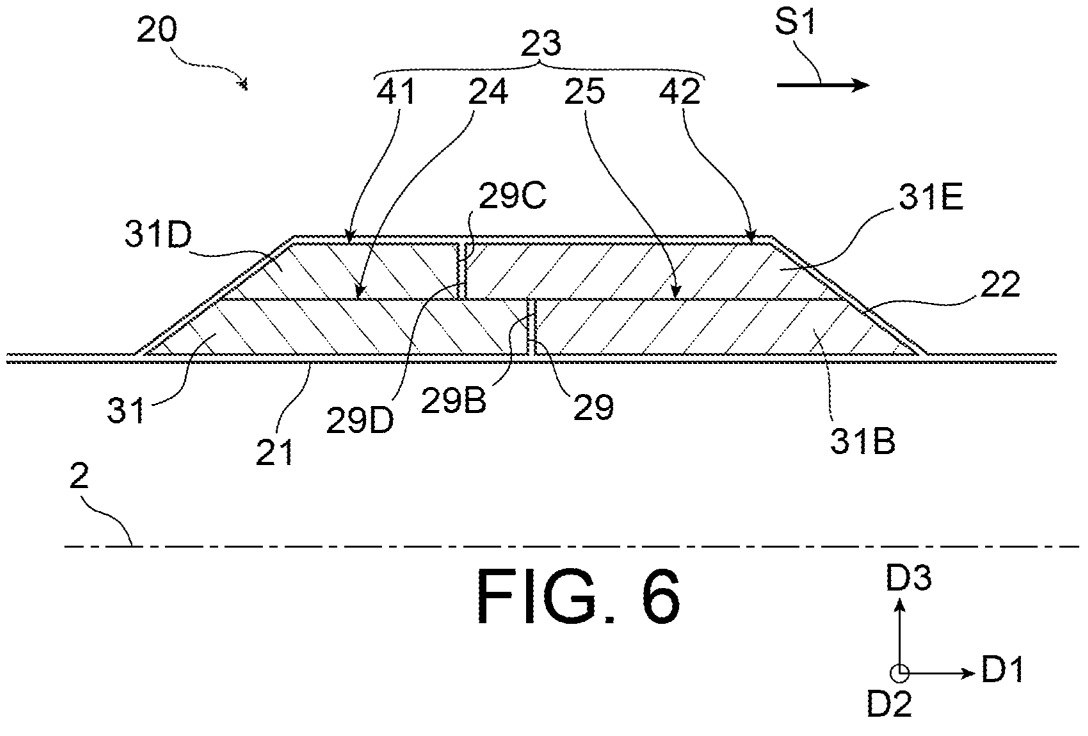
FIG. 6 is a schematic cross-sectional view of a panel according to a third embodiment of the invention, comprising a two-stage cellular structure sandwiched between two skins.

FIG. 6 shows a panel 20 according to a third embodiment of the invention, which differs from that of FIG. 3 in that the cellular structure 23 comprises a second stage. The panel 20 of FIG. 5 is described only according to its differences compared to that of FIG. 3, the description above relating to the first embodiment applying by analogy to this third embodiment.

With reference to FIG. 6, the front blocks 24 and rear blocks 25 form a first stage and the second stage also comprises a front block 41 and a rear block 42 disposed on the external surface of the blocks 24 and 25 of the first stage.

In this example, the front block 41 of the second stage comprises cavities 31D oriented parallel to the cavities 31 of the front block 24 of the first stage, while the rear block 42 of the second stage comprises cavities 31E oriented parallel to the cavities 31B of the rear block 24 of the first stage.

Of course, the orientation of the cavities 31D may be different from that of the cavities 31. Likewise, the orientation of the cavities 31E may be different from that of the cavities 31B.

In the example of FIG. 6, the rear surface 29 of the front block 24 of the first stage is axially offset relative to the rear surface 29C of the front block 41 of the second stage and, correspondingly, the front surface 29B of the rear block 25 of the first stage is axially offset relative to the front surface 29D of the rear block 42 of the second stage. Such an offset allows to improve the mechanical strength of the cellular structure 23.

In a manner known per se, a septum (not shown) is preferably interposed between the two stages of the cellular structure 23. The septum may comprise a composite material, for example made of glass fibres impregnated with micro-perforated epoxy resin, or a metal fabric, for example made of aluminium, or organic of the polyetheretherketone type.

The embodiments described above can be combined. For example, the cellular structure 23 of FIG. 6 may comprise one or more intermediate blocks disposed axially between the blocks 24 and 25 of the first stage and/or between the blocks 41 and 42 of the second stage.

The invention is not limited to the embodiments which have just been described. For example, in an embodiment not shown, the internal skin 21 is solid and the external skin 22 is provided with orifices.

Moreover, the panel 20 may have a geometry different from that illustrated in FIGS. 3 to 6. For example, the front block 24 and the rear block 25 may be asymmetrical and/or form cavities 31 and/or 31B having an angle different from that given as an example above.

What is claimed is:

1. An acoustic panel for an aircraft propulsion assembly, comprising a first skin, a second skin and a cellular structure forming acoustic absorption cavities which each extend along an oblique axis relative to the first skin, wherein the acoustic absorption cavities are distributed into several groups including a first group of the acoustic absorption cavities that are inclined towards a front end of the panel along an axial direction of the aircraft propulsion assembly and a second group of the acoustic absorption cavities that are inclined towards a rear end of the panel along the axial direction of the aircraft propulsion assembly, wherein an inclination of the acoustic absorption cavities allows the acoustic absorption cavities to have an acoustic length greater than a distance between the first skin and the second skin, and wherein the cellular structure comprises a front block consisting of the acoustic absorption cavities of the first group and a rear block consisting of the acoustic absorption cavities of the second group.

2. The acoustic panel according to claim 1, wherein the cellular structure comprises a front edge and a rear edge which are each bevelled.

3. The acoustic panel according to claim 2, wherein several of said acoustic absorption cavities of the first group open onto the front edge of the cellular structure and several of the acoustic absorption cavities of the second group open onto the rear edge of the cellular structure.

4. The acoustic panel according to claim 2, wherein the second skin comprises a front part covering the front edge of the cellular structure and a rear part covering the rear edge of the cellular structure.

5. The acoustic panel according to claim 2, wherein the front edge and the rear edge of the cellular structure each form with the first skin an angle comprised between 30 degrees and 60 degrees.

6. The acoustic panel according to claim 1, wherein the oblique axis of each acoustic absorption cavity of the acoustic absorption cavities forms an angle of inclination relative to the first skin comprised between 30 degrees and 50 degrees.

7. The acoustic panel according to claim 1, wherein the first skin and/or the second skin comprise an organic matrix composite material and the cellular structure comprises a metal material.

8. The acoustic panel according to claim 1, wherein the cellular structure comprises several stages each including acoustic absorption cavities of the first group and acoustic absorption cavities of the second group.

9. A propulsion assembly for an aircraft, comprising at least one acoustic panel according to claim 1.

* * * * *